US010997524B2

(12) United States Patent
Modarresi

(10) Patent No.: US 10,997,524 B2
(45) Date of Patent: May 4, 2021

(54) PREDICTING A NUMBER OF LINKS AN EMAIL CAMPAIGN RECIPIENT WILL OPEN

(71) Applicant: Adobe Inc., San Jose, CA (US)

(72) Inventor: Kourosh Modarresi, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 680 days.

(21) Appl. No.: 15/225,245

(22) Filed: Aug. 1, 2016

(65) Prior Publication Data
US 2018/0032888 A1    Feb. 1, 2018

(51) Int. Cl.
G06N 20/00 (2019.01)
H04L 12/58 (2006.01)
G06N 5/00 (2006.01)
G06N 20/20 (2019.01)

(52) U.S. Cl.
CPC ............ *G06N 20/00* (2019.01); *G06N 5/003* (2013.01); *G06N 20/20* (2019.01); *H04L 51/34* (2013.01)

(58) Field of Classification Search
CPC ......... G06N 5/045; G06N 20/00; H04L 51/34
See application file for complete search history.

(56) References Cited

U.S. PATENT DOCUMENTS

| | | | | |
|---|---|---|---|---|
| 7,680,892 B2* | 3/2010 | Knox | ...................... | H04L 67/22 709/206 |
| 8,670,319 B2* | 3/2014 | Bennett | .................. | G06Q 10/04 370/232 |
| 9,462,313 B1* | 10/2016 | Sbaiz | ................ | H04N 21/25891 |
| 9,608,942 B1* | 3/2017 | Ramakrishnan | ....... | G06Q 30/02 |
| 10,140,581 B1* | 11/2018 | Kiss | ......................... | G06N 5/022 |
| 2003/0004781 A1* | 1/2003 | Mallon | .................. | G06Q 10/06 705/7.31 |
| 2006/0253537 A1* | 11/2006 | Thomas | ................. | H04L 67/22 709/206 |
| 2011/0055000 A1* | 3/2011 | Zhang | ................ | G06Q 30/0229 705/14.43 |

(Continued)

OTHER PUBLICATIONS

Breiman,"Random Forests", Machine Learning, vol. 45, pp. 5-32, 2001, Retrieved from: http://link.springer.com/article/10.1023% 2FA%3A1010933404324, 2001, 28 pages.

(Continued)

*Primary Examiner* — Li B. Zhen
*Assistant Examiner* — Tewodros E Mengistu
(74) *Attorney, Agent, or Firm* — FIG. 1 Patents

(57) ABSTRACT

Techniques for predicting a number of links an email campaign recipient will open are described. Elements in a dataset related to an email campaign are modeled using a tree structure, where nodes of the tree represent features of each element. A mean squared error is computed of an outcome for each of the elements to determine a weight for each respective tree. The weights are then regularized by applying a penalty, such as an elastic net penalty, to each of the weights. Then, the weights are applied to each of the trees. A weighted average of all of the outcomes of the trees is calculated, where the weighted average represents a prediction of an outcome resulting from a set of feature values. The feature values correspond to the nodes of each of the trees.

20 Claims, 5 Drawing Sheets

(56) References Cited

U.S. PATENT DOCUMENTS

2016/0048771 A1* 2/2016 Chen ................ G06N 20/00 706/12

OTHER PUBLICATIONS

Deng,"Feature Selection via Regularized Trees", the 2012 International Joint Conference on Neural Networks (IJCNN), Mar. 21, 2012, 8 pages.
Deng,"Gene Selection with Guided Regularized Random Forest", Pattern Recognition 46(12):, Jun. 21, 2013, 21 pages.
Deng,"Guided Random Forest in the RRF Package", Source: arXiv, Nov. 18, 2013, 2 pages.
Diaz-Uriarte,"Gene selection and classification of microarray data using random forest", BMC Bioinformatics 2006, 7:3, Jan. 6, 2006, 13 pages.
Friedman,"Predictive Learning via Rule Ensembles", the Annals of Applied Statistics 2008, vol. 2, No. 3, 916-954, Nov. 11, 2008, 41 pages.
Hastie,"The Elements of Statistical Learning; Data mining, Inference and Prediction", Second Edition, 2009, 758 pages.
Liaw,"Classification and Regression by random Forest", R News, 2(3), Dec. 2002, pp. 18-22.
Ogutu,"Genomic selection using regularized linear regression models: ridge regression, lasso, elastic net and their extensions", From 15th European workshop on QTL mapping and marker assisted selection (QTLMAS) Rennes, France, May 2011, 6 pages.
Riddick,"Predicting in vitro drug sensitivity using Random Forests", Bioinformatics, 27(2), Dec. 5, 2010, 5 pages.
Tibshirani,"Regression Shrinkage and Selection via the Lasso", Journal of the Royal Statistical Society, Series B, 58, 1996, 28 pages.
Zou,"Regularization and variable selection via the elastic net", J. R. Statist. Soc. B (2005) 67, Part, 2005, pp. 301-320.

* cited by examiner

200

| | Feature1 | Feature2 | Feature3 |
|---|---|---|---|
| User1 | 1 | A | Excellent |
| User2 | 2 | B | Hammer |
| User3 | 3 | C | Futuristic |
| User4 | 4 | D | Secretary |
| User5 | 5 | E | Fire |
| ... | ... | ... | ... |
| UserX | xx | XX | WordxX |

202 — row labels; 204 — Feature1; 206 — Feature2; 208 — Feature3

PREDICTING A NUMBER OF LINKS AN EMAIL CAMPAIGN RECIPIENT WILL OPEN

BACKGROUND

As computing technology becomes more and more commonplace, users and businesses can easily collect data regarding aspects of everyday life. Users and businesses may further wish to analyze the data to make predictions of possible future occurrences of certain events. Take, for example, email campaigns that target recipients with the aim of having the recipients take some type of desired action. In the absence of any knowledge about the behavior of the email users, it is much less likely to be able to conduct a successful campaign. Thus, it can be desirable to gather sufficient insights about the users' expected actions upon receiving an email and use the insights to carry out more efficient campaigns.

SUMMARY

Techniques for predicting a number of links an email campaign recipient will open are described. In one or more implementations, a data matrix is generated from a set of data relating to recipients of an email campaign. The data matrix has m number of rows and n number of columns. Entries in the rows represent individual elements, or individual email campaign recipients, in the dataset. Entries in the columns represent features associated with each respective element or email recipient. The elements in the dataset are modeled using tree structures, where nodes of the tree are the features associated with each element. A mean squared error is computed of an outcome for each of the elements to determine a weight for each respective tree. The weights are then regularized by applying a penalty, such as an elastic net penalty, to each of the weights. Then, the weights are applied to each of the trees. A weighted average of all of the outcomes of the trees is calculated, where the weighted average represents a prediction of an outcome resulting from a set of feature values. The feature values correspond to the features in the columns of the matrix, and/or the nodes of each of the trees.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
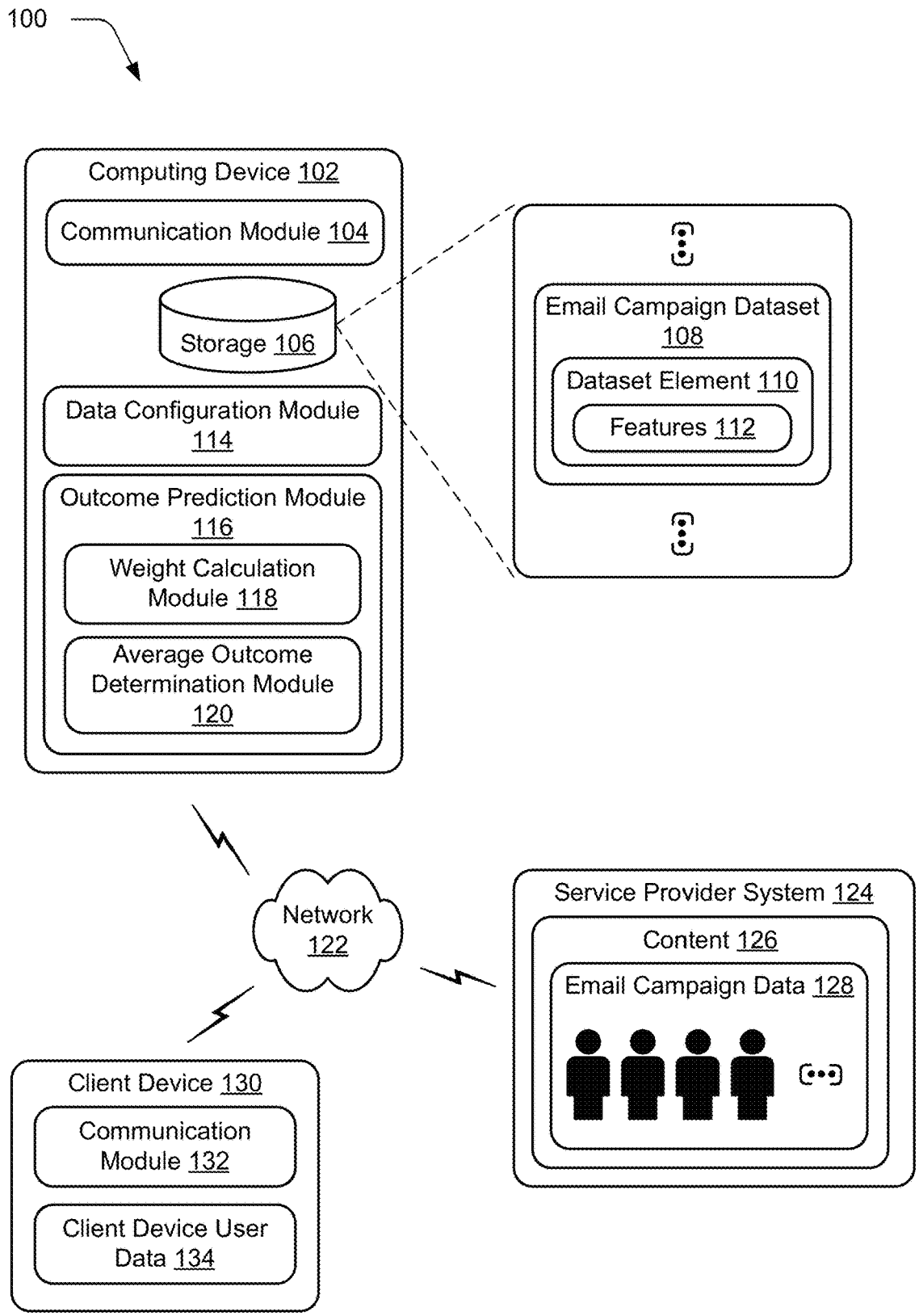
FIG. 1 illustrates an example operating environment in accordance with one or more implementations.

Techniques described herein provide solutions to problems faced by marketers and advertisers when trying to make accurate and relevant predictions from sets of data relating to recipients of an email marketing campaign. In one implementation, the described techniques generate a data matrix from a set of data corresponding to the recipients of the marketing campaign, or receive an already-generated data matrix that comprises a set of data. The data matrix has m number of rows, where m can be any number of individual elements in the set of data. The data matrix also has n number of columns, where the n columns represent features of each respective element. To assist with understanding, consider a dataset that corresponds to recipients of an email campaign for sports equipment. The elements in the dataset correspond to each of the individual email recipients. The features in the dataset may correspond to a location of the particular email recipient, a nearby sports team of the email recipient, a recent sports equipment purchase made by the email recipient, a sports topic discussed on social media by the email recipient, and an age of the email recipient. Based on the set of data, a marketer may wish to determine the likelihood that a recipient of the email campaign will click on more than three links after opening the email. This prediction is intended only as an example to more easily comprehend aspects of the described embodiments, and is in no way intended to be limiting.

Training datasets can be generated from an overall dataset that represents recipients of the email in the email campaign. These training datasets may have known outcomes for each of the elements in each of the training datasets. Decision trees are then generated using these training datasets. In each decision tree, nodes correspond to the features of the elements of the datasets. Continuing with the example of the email campaign for sports equipment, each tree may have features that appear as nodes in any decision tree including location, nearby sports team, recent purchase, recently discussed topic, and age that correspond to the above features.

A weight is computed for each of the decision trees generated for the dataset. The weight may be computed by finding a mean squared error of an outcome for each of the elements in the dataset. The weights are then regularized, such as by applying an elastic net penalty to each of the weights. Regularizing the weights is a way of preventing overfitting of the dataset. In more specific terms, regularization ensures that only properties of the dataset are included in the analysis that can be generalized to all of the data and eliminates information or characteristics that may be considered noise from the dataset. An elastic net penalty is found using a function that prevents overfitting and reduces a dimension of data from its current high dimension. High dimensionality could lead to instability and inaccuracy in other penalty functions. More details regarding the elastic net penalty and regularization are discussed below. In the above example, regularizing the weights of the current trees may include penalizing many specific features common only to the recipients of the particular email and not applicable in any other recipients of different emails of other data sets.

The regularized weights are then applied to each of the decision trees. Once the regularized weights are applied, a weighted average is calculated of all of the outcomes of the decision trees combined. The weighted average represents a prediction of an outcome resulting from the feature values represented in the columns of the matrix. Returning to the example of the marketer wanting to know based on the dataset if a recipient will open more than three links after opening the email, the weighted average represents a likelihood that an email recipient who has not yet received the email from the campaign will open more than three links, based on other known features of the particular recipient combined with the rest of the dataset using the above techniques.

In the discussion that follows, a section titled "Operating Environment" is provided that describes one example environment in which one or more implementations can be employed. Next, a section titled "Predicting a Number of Links an Email Campaign Recipient Will Open" describes example details and procedures in accordance with one or more implementations. Last, a section titled "Example System" describes example computing systems, components, and devices that can be utilized for one or more implementations for predicting outcomes from a set of data.

Operating Environment

FIG. 1 illustrates an operating environment generally at 100 in accordance with one or more implementations for predicting a number of links an email campaign recipient will open. The computing device may include a processing system having one or more processors and devices (e.g., CPUs, GPUs, microcontrollers, hardware elements, fixed logic devices, etc.), and one or more computer-readable media. The various modules 104 and 114-120, along with the storage 106, are included on the computing device 102 and may reside on the computer-readable media to be executed by the processing system. Examples of processing systems and computer-readable media can be found in the discussion of the example computing system of FIG. 6.

The processing system of the computing device 102 may retrieve and execute computer-program instructions from the modules 104 and 114-120, and other applications of the computing device (not pictured) to provide a wide range of functionality to the computing device 102, including but not limited to gaming, office productivity, email, media management, printing, networking, web-browsing, and so forth. A variety of data and program files related to the applications can also be included, examples of which include games files, office documents, multimedia files, emails, data files, web pages, user profile and/or preference data, and so forth.

The computing device is shown as having a communication module 104, which is configured to communicate with and obtain resources from a service provider system 124 via a network 122. The service provider system 124 enables the computing device 102 to access and interact with various resources made available by the service provider system 124. One example of a service provider system 124 is a marketing data management system such as the Adobe Marketing Cloud™. The service provider system 124 may provide users with a platform to gather marketing data, gain insight on industry customers, build personalized advertising campaigns, and manage content and assets for such campaigns.

The resources made available by the service provider system 124 can include any suitable combination of content and/or services typically made available over a network 122 by one or more service providers. For instance, content 126 can include various combinations of text, video, ads, audio, multi-media streams, applications, animations, digital images, webpages, and the like. Content 126 may also comprise data in the form of datasets that the computing device 102 may access, and/or data that the computing device 102 may access via the network 122. For example, content 126 may comprise email campaign data 128. As pictured, email campaign data 128 comprises data relating to individual recipients of an email campaign. Some examples of email campaign data 128 may comprise the email addresses of the campaign's recipients, whether the campaign's recipients subscribe to an online service, or a social networking application commonly used by the campaign's recipients, to name only a few examples. Email campaign data 128 may also include marketing analytics data, campaign performance data, marketing content and assets, marketing media budgeting information, social media tracking data, and/or advertising content alternatives which can be used in real-time personalization of advertisements.

The communication module 104 of the computing device 102 may also be configured to communicate with and obtain resources from client devices, such as the client device 130, via the network 122. The client device 130 also has a communication module 132, which may provide similar functionality to the communication module 104 of computing device 102. As pictured, the client device 130 also comprises client device user data 134, which is information relating to a user of the client device which may be useable in creating an email campaign, for instance. The resources obtained from the client device 130 over the network 122 may include all or part of this client device user data 134, along with any suitable combination of content or services, such as email, documents, videos, digital images, webpages, social networking functionality and content, and the like. Resources obtained from the client device 130 may also comprise data in the form of datasets that the computing device 102 may access, and/or data that the computing device 102 may access to generate datasets which is discussed in more detail below. The computing device 102 may make use of the communication module 104 to communicate with the service provider system 120 and/or the client device 130 via the network 122 through one or more of a cellular network, a PC serial port, a USB port, and wireless connections such as Bluetooth or Wi-Fi, to name a few.

The computing device 102 may also include a storage element 106 Storage element 106 is configured to store one or more datasets, such as email campaign dataset 108. The email campaign dataset 108 may be made up of one or more dataset elements 110, where each of the dataset elements 110 has one or more features 112. In the case of the email campaign dataset 108, each of these dataset elements 110 corresponds to an individual recipient of the email campaign, and the features 112 correspond to features of each recipient of the email campaign. In one or more implementations, each of the dataset elements 110 in the email campaign dataset 108 has the same number of features 112, although embodiments are contemplated where the dataset elements 110 of the same email campaign dataset 108 have different numbers of features 112. The email campaign dataset 108 may comprise information obtained from the service provider system 124 via the network 122 regarding email campaign data 128. Alternatively or additionally, the email campaign dataset 108 may comprise information obtained from one or more client devices via the network 122, such as client device 130, including client device user data 134.

While the provided examples relate to an email campaign dataset, the techniques described herein may be used to generate and analyze datasets representing any group having any number of characteristics. The plant dataset provided above is one example of an alternate possible dataset. A very limited list of additional examples of possible datasets may include movies, cars, smartphones, retailers, animals, medicines, service providers, or nutrition facts of foods.

Further, the features of the elements in a dataset may be anything related to the particular dataset. For example, for a dataset about movies, the features may include length, director, producer, filming location, number of awards received, number of award nominations, genre, leading actor, and amount of box office sales, to name only a few possibilities. To name one additional example, for a dataset about cars, the features may include drivetrain, engine, model year, remote start, number of seats, transmission, top speed, and speaker system, to name but a few examples. It should be clear that any dataset having any number of elements and any number of features of the respective elements is within the scope of the claimed subject matter.

The computing device 102 is also shown as having a data configuration module 114. The data configuration module 114 represents functionality to configure datasets such as the email campaign dataset 108 stored in the storage element 106 to be in an appropriate format for use by the outcome prediction module 116. For example, datasets or information received from the service provider system 124 and/or the client device 130 may not be in a format that is preferable for analysis by the outcome prediction module 116. Consequently, configuring datasets by the data configuration module 114 may include generating data matrices of the email campaign dataset 108, such as arranging the datasets 108 in rows for each dataset element 110 and columns corresponding to the features 112 of each dataset element 110. The data configuration module 114 may also be configured to arrange the email campaign dataset 108 into trees, such as classification and regression trees (or CART). Each CART represents all of the elements 110 in the dataset, and the leaves of the CART represent each individual element 110. The data configuration module 114 may be able to arrange the email campaign dataset 108 into other arrangements, such as classification trees (such as for class labels), regression trees (such as for numbers), and other methods of structured data analysis.

In addition, the computing device 102 includes an outcome prediction module 116, which includes a weight calculation module 118 and an average outcome determination module 120. The outcome prediction module 116 and associated modules 118-120 are configured to work together to predict one or more outcomes for elements of the email campaign dataset 108 with unknown feature(s) to be predicted. Continuing with the example of the email campaign, the outcome prediction module 116 and associated modules 118-120 can be used to predict a number of links that a recipient of the email campaign will open.

Upon receiving configured data from the data configuration module 114, the weight calculation module 118 then computes weights for each of the trees, such as each of the decision trees generated for the dataset elements 110. The weights can be computed using a mean squared error, as discussed above and below. The weight calculation module 118 regularizes the weights to prevent overfitting and penalize information included in the email campaign dataset 108 that cannot be generalized to other datasets. Once the regularized weights are applied to each of the decision trees, the average outcome determination module 120 calculates a weighted average of all of the decision trees combined. The weighted average provides a prediction for an outcome of an element with unknown feature(s), where the element has at least some features that are present in the email campaign dataset 108. For instance, the weighted average can provide a prediction of the number of links that a recipient of the email campaign will open based on known features of the particular recipient.

Having described an example operating environment, consider now example details and techniques associated with one or more implementations of predicting a number of links an email campaign recipient will open.

Predicting a Number of Links an Email Campaign Recipient Will Open

As discussed above, the techniques described herein may be used to predict outcomes from almost any set of collected data. One instance where predicting outcomes from a set of data may be particularly useful is targeting recipients in an email campaign. In the absence of any knowledge about the behavior of email users, the likelihood of having a successful email campaign may be in question. It can therefore be important to gather insights about users' expected actions upon receiving an email, and to use these insights to carry out more efficient email campaigns.

A primary objective of an email campaign is to have a user navigate through a path that leads to a sought-after action. For instance, the path may include clicking on a link within the email that leads to the email sender's webpage, followed by the user purchasing a product or service from the email sender's webpage. This path is initiated by opening the link inside of an email, while the desired activity (in this case, purchasing a product or service) cannot take place until the link in the email is clicked on. Therefore, the techniques described herein may be used to predict a number of links a user may click on after opening an email. The following description will generally relate to predicting the number of links an email recipient will open. However, it should be readily understood that the techniques may be applied to making predictions for any possible set of data as described above.

Figures 2, 3:
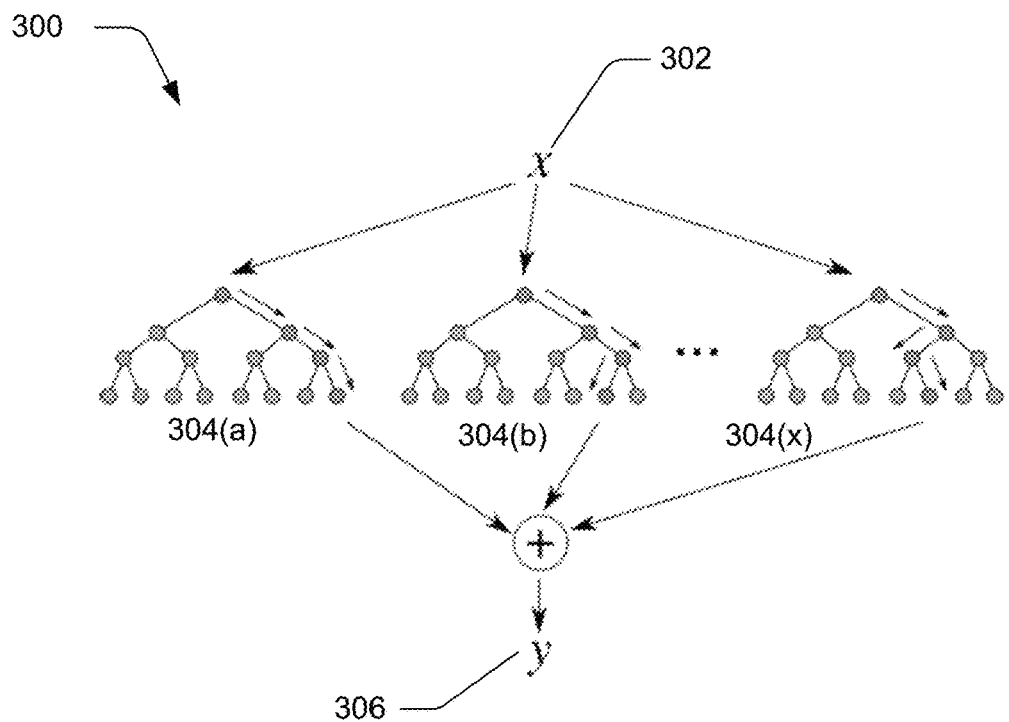
FIG. 2 is a diagram depicting an example dataset and corresponding structure in accordance with one or more implementations.
FIG. 3 is a diagram depicting data being organized in a group or ensemble of a tree structure in accordance with one or more implementations.

FIG. 2 depicts an example dataset, generally at 200, which may be used in accordance with predicting data number of links an email campaign recipient will open in accordance with one or more embodiments. The dataset is shown in a table or matrix format, which may be the original format of the dataset. Alternatively or additionally, the dataset may originate in another format, such as a list, and be reformatted to be displayed in a table or matrix format such as by the data configuration module 114. Here, the dataset has multiple elements 202, which are displayed as User1-UserX. Each row of the matrix corresponds to a different element or user 202. Further, each of the users 202 has multiple features 204-208, which are represented by the columns of the matrix. While the current example displays a matrix having three features 204-208 for each user 202, any suitable number of features is contemplated.

The features of the dataset may be made up of various types of inputs. For example, the first feature 204 is shown as a numeric input that corresponds to a feature of each user. Examples of numeric features of a user may include number of links clicked per email, a recipient identification number for each user, the user's zip code, an age of the user, a number of different devices that the user has associated with an email account, number of past purchases the user has made from the website, how long it took for the user to open the email, or number of persons in the user's family, to name only a few possibilities.

The second feature 206 is shown as an alphabetic or alphanumeric input (e.g., a text string) that corresponds to a feature of each user. Examples of possible alphabetic or alphanumeric features of a user may include a state or country code, a code for the language the user speaks/reads, an indicator of whether the email was opened (Y/N), or an indicator of whether the user is subscribed to an email list (Y/N), for instance. Further, the third feature 208 is shown as a word or string input that corresponds to a feature of each user. Possible word or string inputs may be a city that the user lives in, the user's employer name, a name of the last product or service that the user purchased from the website, another subscription that the user may have, a group or club that the user is a part of, or a social networking website that the user is a member of, to name but a few possibilities.

The features 204-208 are a limited representation of the possibilities of features that may be part of the dataset for each user. Different email marketing campaigns may have different priorities and metrics that may be used to consider a campaign successful. Further, different email marketing campaigns may have access to additional or different data not described above, which may assist in making predictions as part of a dataset. The features 204-208 described above are also a limited representation of the types of data that may be part of the dataset. For example, the dataset may comprise a combination of the three categories above, such as a single feature having a numeric component and an alphabetic component, or a single feature having a string component and a numeric component. Other types of inputs to the dataset are also considered, such as symbols, binary, or other inputs.

The data in the dataset may in addition, or alternatively, be modeled using a random forest model. A random forest modeling approach is based on the concept that an ensemble of weak learners, when weighted and aggregated correctly, can form a very robust and accurate learner. A weak learner is a model that is only slightly better than a total random model. However, when many weak learners are combined in particular ways, the output is a strong learner capable of accurate predictions.

One type of a weak learner is a decision tree or a classification and regression tree (CART), an example of which is pictured in FIG. 3 at 300 where a group (ensemble of trees) are shown. A decision tree or CART is a weak learner that has many shortcomings on its own, such as discontinuity, high variance, and low accuracy. However, decision trees or CARTs can be grouped, or ensembled, into a random forest which is depicted generally at 300. The data from the dataset is input as the x variable 302. In one embodiment, data from the dataset is input directly and formatted into the CART model, such as by use of the data configuration module 114. Alternatively or additionally, the input x variable 302 is a data matrix generated from the dataset, such as the matrix described in relation to FIG. 2. In the case where the input x variable 302 is a data matrix, each of the CARTs 304(*a*)-304(*x*) may comprise all of the elements, or users, in the matrix. Each of the CARTs 304(*a*)-304(*x*) are distinct and independent of each other. The nodes of each CART 304(*a*)-304(*x*) correspond to the features found in the columns 204-208 of the data matrix.

The output, or dependent variable, of the model is the y variable 306. Following with the example of the email campaign, the y variable 306 in this instance would correspond to the number of links to be opened, and all other variables are covariate, input, and/or independent variables. The other variables are represented by the rest of columns or attributes in the data matrix, and y is one of the original columns or features chosen as output. The y variable 306 represents a final outcome which is a weighted average of all outcomes of the individual CARTs 304(*a*)-304(*x*). The final outcome of the y variable 306 may be computed by:

$$Y = F(X) = \sum_{i=1}^{N} a_i h_i(X) \qquad (1)$$

Where $h_i(X)$ is a basis or weak learner, which in this case is a CART, $a_i$ is a weight parameter (described in more detail below), and N is the total number of CARTs used in the random forest. In this case, all of the CARTs are the same size, although embodiments are contemplated in which the CARTs are of different sizes.

The weights $a_i$ are computed by minimizing an objective function, otherwise known as a loss function. Minimizing the loss function of Equation (1) above is provided by:

$$\operatorname*{Argmin}_{\{a_i\}} \left( \frac{1}{N} \sum_{i=1}^{N} L(y_i, a_i h_i(X)) \right) \qquad (2)$$

In Equation (2), the variables correspond to the same variables in Equation (1), where L is the loss function for each of the weights. One example of a possible loss function that may be used to compute each of the weights is a mean squared function, which leads to:

$$L(y_i, a_i h_i(X)) = \|y_i - a_i h_i(X)\|_2^2 \qquad (3)$$

Again returning to the above example of predicting the number of links an email recipient will open, the outcome is the number of links each email recipient will open, represented in Equation (3) by $y_i$. In computing the loss function, the outcome, or number of links, is known for each email recipient. Equation (3) then subtracts a number of predicted links that an email recipient will open, which is computed by the model from $a_i h_i(X)$, from the actual number of links $y_i$ that the particular recipient being analyzed actually opened. To compute the weight for each CART, the final equation results in:

$$\operatorname*{Argmin}_{\{a_i\}} \left( \frac{1}{N} \sum_{i=1}^{N} \|y_i - a_i h_i(X)\|_2^2 \right) \qquad (4)$$

Equation (4) applies the loss function from Equation (3) for each of the weights in Equation (2), to compute a mean squared error to be used to compute the weight parameter in Equation (1).

Even though the weights calculated in the above equations provide a better model than the CARTs alone, the model is still subject to shortcomings, such as overfitting. Overfitting is a phenomena of modeling that almost always occurs for two main reasons. First, data that a model is trained with is different from unknown data or test data, and therefore each set of data requires a different model. This means that a training model is very unlikely to execute on unknown or test data with desired accuracy. In other words, two systems are in play: a first system where all outcomes are known, otherwise known as the training dataset; and a second system where outcomes are unknown, otherwise known as the test dataset. Each of these systems has its own, different model. Second, the model from the known, training dataset does not represent features of all unknown datasets. The model from the known, training dataset has only captured, adopted, and/or fitted properties and characteristics of the known dataset. This results in generalization of the model of the known, training dataset when applied to the unknown dataset.

Because of the nearly infinite number of CARTs that could be deployed in the random forest model of Equation (1), overfitting is especially problematic. This gives the model great freedom in the types and amount of information that can be included in the model. However, this freedom also causes higher complexity, which easily leads to overfitting of known datasets' properties and characteristics as described above. Thus, because many CARTs may be used in a particular model, a penalty function may be used to assist in overcoming the overfitting. In the described techniques, the penalty function is achieved by regularization. Several different techniques may be used to achieve regularization of the model, such as penalizing the size of trees (or CARTs), penalizing the number of variables used for each tree and/or each node, penalizing the maximum number of trees used in random forest or the leaves of each tree, penalizing the node purity function (the Gini index), or penalizing the weights of each tree.

In the current case, regularization is achieved by applying a penalty to each of the weights, such as by:

$$\{a_i\} = \underset{\{a_i\}}{\text{Argmin}} \left( \left( \frac{1}{N} \sum_{i=1}^{N} \|y_i - a_i h_i(X)\|_2^2 \right) + \text{Regularization Function} \right) \quad (5)$$

There are several different choices available for a penalty function to be applied to each of the weights, including a ridge penalty and a LASSO penalty. However, these penalty methods can be characterized by high correlation and high dimensionality, which can lead to instability in the LASSO penalty and inaccuracy in the ridge penalty. Another option is to use an elastic net penalty for each of the weights. Localized elastic net penalties treat each of the trees, or each of the weights in the above examples, differently from other trees and weights in the model. Incorporating the localized elastic net penalty into the above equations to form a regularization function $P_{a,\alpha}(a, \alpha)$ leads to:

$$\text{Regularization Function} = P_{a,\alpha}(a, \alpha) = \Sigma_{i=1}^{N}(\alpha_i-1) \\ \frac{1}{2}\|a_i\|_2^2 + (2-\alpha_i)\|a_i\|_1) \quad (6)$$

Where vector α represents the tradeoff coefficient between the Euclidian second norm penalty (regularization) and the first norm or LASSO penalty (regularization). Rather than using either of these regularization penalties on their own, combining these regularization penalties avoids problems that may arise when they are used independently. For example, the Euclidean norm penalty assumes normal distribution of the data which may not be correct in many cases. On the other hand, the LASSO first norm penalty may lead to problems when the data matrix is overdetermined, or in other words, has more rows than columns. Combining these techniques using an elastic net penalty avoids these problems. In addition, applying the localized elastic net penalty provides localized regularization so each tree is treated differently than other trees, rather than all trees being treated the same and resulting in a biased outcome and overfitting of the model.

The goal of the model described by Equation 5 is to use information about the test data, described above, to make predictions for incoming data having unknown properties or characteristics. To accomplish this goal, it is important to restrict learning of the model to information of the test dataset(s) that is applicable to incoming datasets with unknowns. Therefore, the model described herein utilizes properties and characteristics that are generalizable, and not particular to the specific dataset, so that the model can be generalized to incoming, unknown data. Overfitting occurs when the model captures these specific properties that are particular to the dataset, and cannot be true characteristics of any other dataset. Should this overfitting occur, the model would make incorrect predictions for incoming datasets having any different characteristics or properties. However, utilizing the techniques described herein, overfitting is minimized and thus the model can easily be applied to unknown sets of data.

In one illustrative example, the dataset depicted in FIG. 2 may correspond to characteristics of email recipients in an email campaign, and may be used with the equations above to predict a number of links a recipient of the email campaign will open. As discussed above, each of the rows 202 represents an individual user. The columns 204-206 represent features of each respective user. For example, an additional column (not pictured) may indicate whether each of the individual users have opened the particular email of the email campaign. Additional columns may indicate a number of links each of the individual users clicked on after opening the email, and a city of residence of each individual user. Additional features of each user may also be present in this particular dataset. It should be noted that the dataset may contain alphabetic and alphanumeric entries, which can all be used in the prediction process to determine predictions of potential users.

The dataset depicted at 200 corresponds to the x input 302 of FIG. 3. Consequently, the individual users represented by the rows in the dataset, i.e., the data set used in CARTs 304(a)-(x) of FIG. 3, provide the nodes of the CARTs 304(a)-(x) corresponding to the columns of the dataset. Using the equations provided above, an accurate prediction can be made for a number of links a recipient of the email campaign will open, according to features of the recipient and how those features compare to known outcomes in the dataset. Further, these predictions will avoid overfitting the model to new datasets by utilizing the regularization function. This will allow the creators of the email campaign to test new, unknown features of the campaign using known, test datasets to generate accurate predictions.

Example Procedures

The following discussion describes techniques that may be implemented utilizing the previously described systems and devices. Aspects of each of the procedures may be implemented in hardware, firmware, or software, or a combination thereof The procedures are shown as a set of blocks that specify operations performed by one or more devices and are not necessarily limited to the orders shown for performing the operations by the respective blocks.

Figure 4:
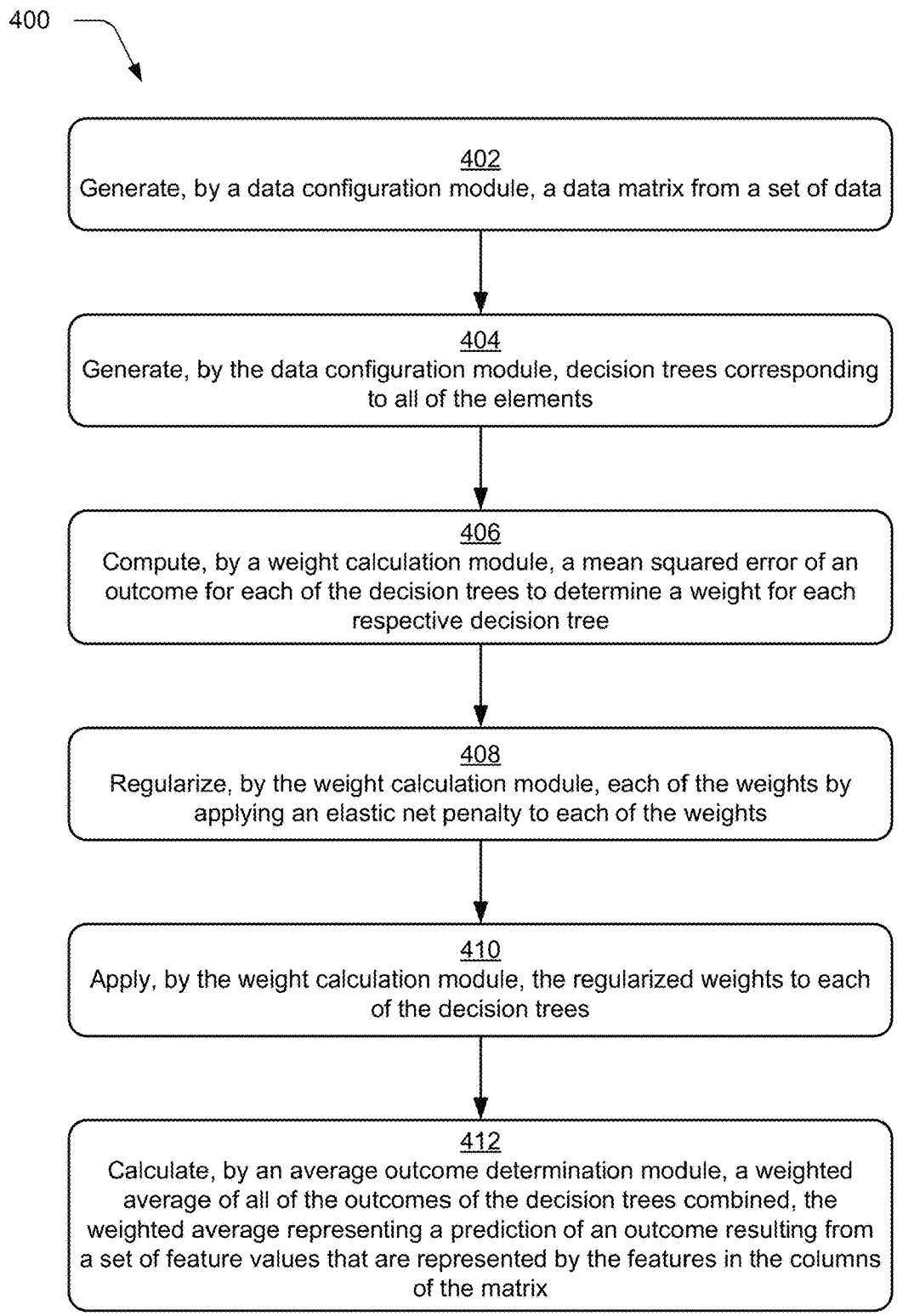
FIG. 4 is a flow diagram that describes details in an example procedure which includes generating decision trees to predict outcomes from a set of data in accordance with one or more implementations.

FIG. 4 depicts, generally at 400, a flow diagram for an example procedure to predict outcomes from a set of data. The procedure depicted in FIG. 4 can be implemented by way of a suitably configured computing device and applications, such as the data configuration module 114 and the outcome prediction module 116 of FIG. 1. The procedure of FIG. 4 can also be implemented by way of other functionality described in relation to FIGS. 1-3 and 6. Individual operations and details discussed in relation to FIG. 4 may also be combined in various ways with operations and details discussed herein in relation to the example procedures of FIG. 5.

A data matrix is generated from a set of data (block 402). In one or more implementations, the data matrix is generated by way of a data configuration module, such as the data configuration module 114 of FIG. 1. In the illustrated example, the data matrix has m rows and n columns, where entries in the rows represent individual elements and entries in the columns represent features of each respective element. The set of data may be generated by a computing device, or may be received from a service provider or another computing device via a network, for example. In one implementation, the data matrix may be generated from a set of data relating to users in an email campaign. In this scenario, the data matrix may contain data from users of client devices, such as client device 124 of FIG. 1, that have received emails as part of an email campaign generated at the computing device 102. However, numerous other embodiments are also contemplated.

Decision trees are generated corresponding to all of the elements in the data matrix (block 404). Decision trees may also be generated by the data configuration module 114 described in FIG. 1, as described above. Each of the decision trees has nodes corresponding to each element in the data matrix. The decision trees may be CARTs that incorporate multiple types of numeric, alphabetic, and/or string entries, although other types of decision trees are contemplated. The decision trees may form a model that comprises an ensemble of CARTs in a random forest model, as discussed above.

A mean squared error is computed of an outcome for each of the decision trees to determine a weight for each respective decision tree, such as by a weight calculation module (block 406). The weight calculation module that computes the means squared error may have functionality such as the functionality provided by the weight calculation module 118 of FIG. 1. The mean squared error can be found by subtracting an outcome predicted by the model from an actual outcome for each respective individual element. In the example of the email campaign, this can be performed by subtracting an average predicted by the model of a number of links to be opened from the actual number of links being opened for the particular user being analyzed, and then computing the same errors for all other users or elements. These differences are squared and summed over all users or elements. Then the total sum of squared errors is divided by the total number of users to arrive at the mean squared error for all users in the data set being analyzed. Again, the email campaign is provided only as an example and is not intended to be limiting.

Each of the weights is regularized by applying an elastic net penalty to each of the weights (block 408). Applying the penalty to each of the weights may comprise adding the elastic net penalty to each of the weights. Once the weights are regularized using the penalty for each of the weights, the regularized weights are applied to each of the decision trees (block 410). Regularizing the weights and applying the regularized weights to each of the decision trees may also be performed by a weight calculation module similar to weight calculation module 118.

Then, a weighted average of all of the outcomes of the decision trees combined is calculated (block 412). This may be executed by an average outcome determination module, such as the average outcome determination module 120 of FIG. 1. The weighted average represents a prediction of an outcome resulting from a set of feature values that are represented by the features in the columns of the matrix. Continuing with the example of the email campaign, the outcome may correspond to a prediction of the number of links a recipient of the group of email recipients will click on after opening an email.

In one or more implementations, the dataset above may be a training dataset, where all of the outcomes are known. In this scenario, the training dataset may be used to predict unknown outcomes of elements having at least some features that coincide with the elements in the dataset. In the email campaign example, the training dataset may be used to predict how many links a user will click on after opening an email based on characteristics of that particular user, and how those characteristics coincide with other users that are known in the dataset.

Alternatively or additionally, the dataset may be part of a larger dataset, where all of the outcomes are known in both the dataset and the larger dataset. In this case, the additional data that is not used in the dataset for training the model can be used to analyze an amount of error in the prediction of outcomes. For example, the dataset can be used to train the model based on the elements in the dataset. The model can then make predictions based on features of the elements. Then, comparisons can be made to determine the accuracy of the model's predictions. These forms of testing can be used to determine a threshold amount of data that is needed to obtain the desired accuracy, or which features of elements may be more indicative of a particular outcome. In one or more implementations, techniques such as k-fold cross validation may be used to test the model. K-fold cross validation is one technique for assessing how the results of a statistical analysis will generalize to an independent dataset. In other words, k-fold cross validation estimates how accurately a predictive model will perform in practice. A model, such as the model described herein, is given a dataset of training data on which training is run using the model, and a dataset of unknown data against with the model is tested.

Figure 5:
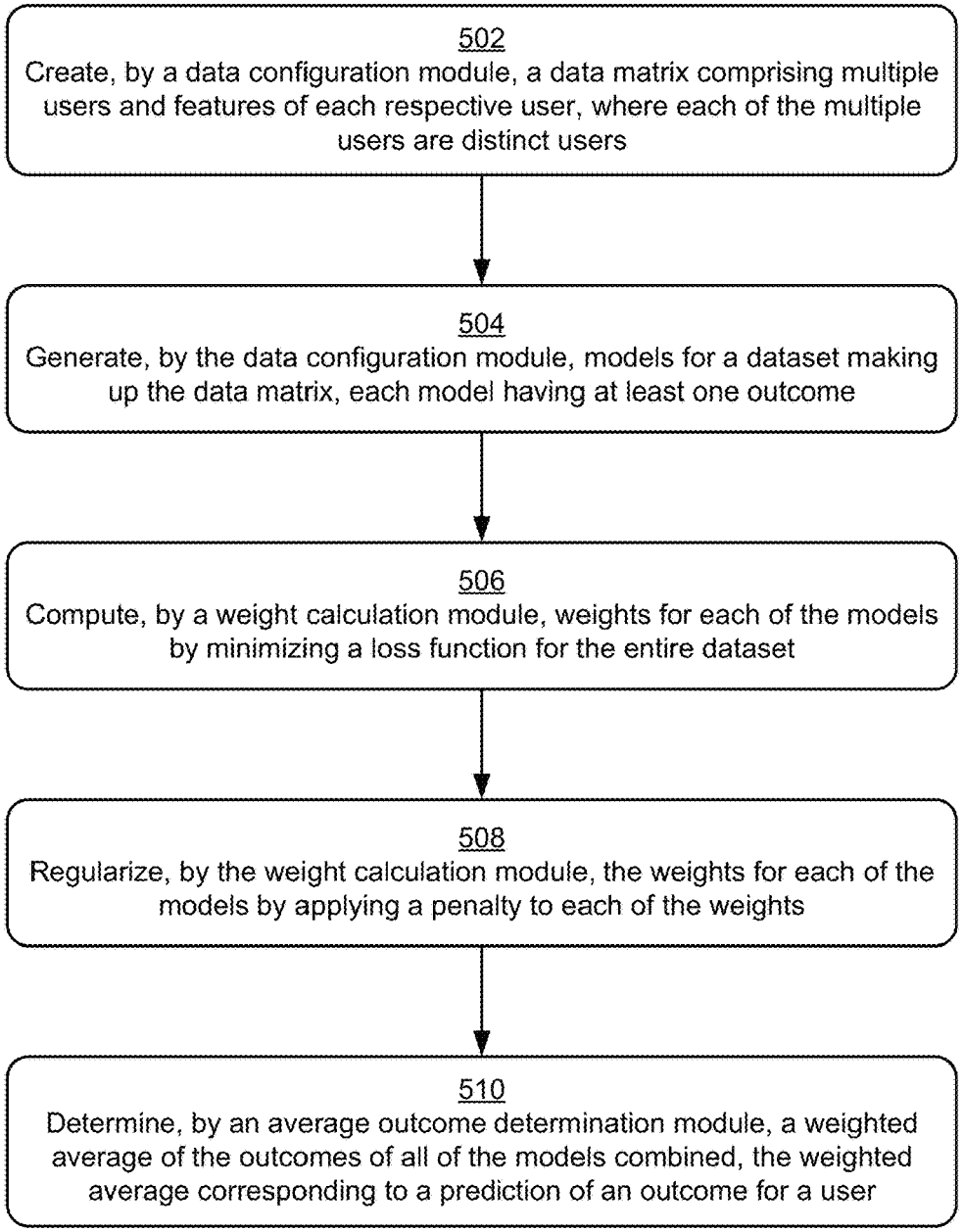
FIG. 5 is a flow diagram that describes details in an example procedure for predicting outcomes from a set of data comprising email recipients in accordance with one or more implementations.

FIG. 5 depicts a flow diagram, generally at 500, for an example procedure to predict outcomes from a set of data. The procedure depicted in FIG. 5 can be implemented by way of a suitably configured computing device and applications, such as the data configuration module 114 and the outcome prediction module 116 of FIG. 1. The procedure of FIG. 5 can also be implemented by way of other functionality described in relation to FIGS. 1-3 and 6. Individual operations and details discussed in relation to FIG. 5 may also be combined in various ways with operations and details discussed herein in relation to the example procedures of FIG. 4.

A data matrix is created such as by the data configuration module 114 comprising multiple users and features of each respective user, where each of the multiple users are distinct users (block 502). As discussed above, the set of data may be generated by a computing device, or may be received from a service provider or another computing device via a network, for example. The users may be recipients of emails in an email campaign, however other types of users are also contemplated. For example, the users may be users of a social networking site, users who visit a particular webpage, users of a cellular network, or users of a particular application on a computing device, to name a few examples. Distinct users may correspond to users not being repeated in the dataset. However, distinct users may also include a single user having multiple accounts on one of the platforms described above. In other words, a single user may have multiple email accounts, for instance, and each account may be considered a distinct user.

For the same dataset, many models are generated by the data configuration module 114, where each model has at least one outcome (block 504). Each model corresponds to a weak learner. An example of a weak learner is a decision tree. The outcome of the model may be a metric of a desired result, such as a number of links that are accessed as a result of an email campaign, or a number of posts viewed on a social networking website. These are intended only as examples of possible outcomes, and are not intended to be limiting.

Weights are computed by the weight calculation module 118 for each of the models by minimizing a loss function for the entire data set comprising of all users (block 506). For example, the weights can be computed using a mean squared error, as described in detail above. The weights are then regularized by the weight calculation module 118 for each of the models by applying a penalty to each of the weights (block 508). In one or more implementations, an elastic net penalty is used to regularize each of the weights, providing a localized regularization to prevent overfitting and to reduce incorporating specialized features of data that are not generalizable to other datasets.

A weighted average of the outcomes of all of the models combined is determined using the average outcome determination module 120. The weighted averaged corresponds to a prediction of an outcome for a user (block 510). As discussed above, the prediction may correspond to a number of links the user will open after opening an email. Alternatively or additionally, in the example of the social networking web site, the prediction may correspond to a number of posts that a user will view on the social networking web site. Further, as described above, the prediction may be a prediction of the behavior of an unknown user, or may be compared to a known outcome of that user to analyze the proficiency of the overall model.

Example System

Figure 6:
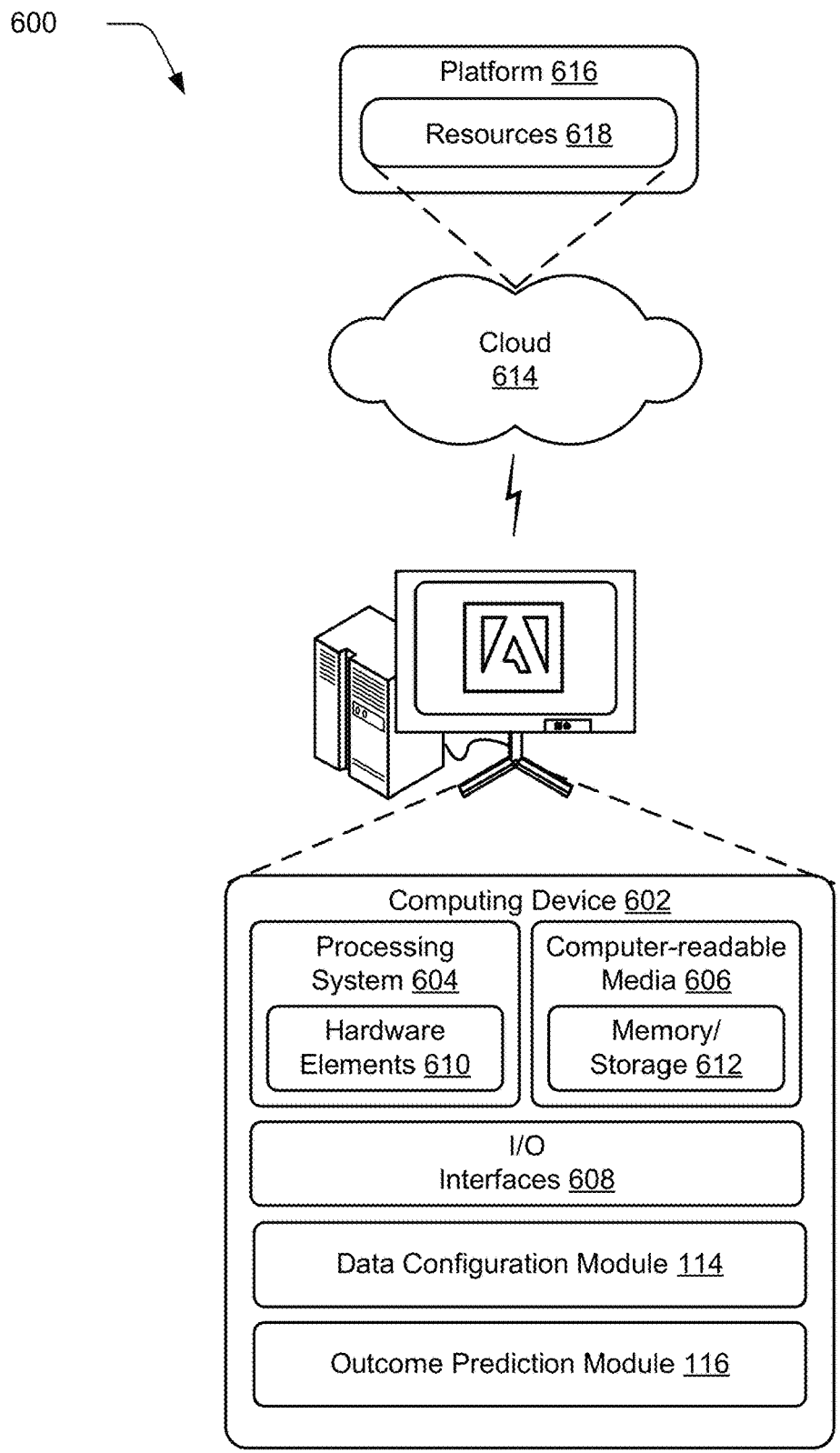
FIG. 6 is a block diagram of a system that can include or make use of predicting outcomes from a set of data in accordance with one or more implementations.

FIG. 6 illustrates generally at 600 an example system that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 602, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the communication module 104, storage 106, data configuration module 114, outcome prediction module 116, and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system of FIG. 6, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer, mobile, and camera uses. Each of these configurations includes devices that may have generally different constructs and capabilities, and thus the computing device 602 may be configured according to one or more of the different device classes. For instance, the computing device 602 may be implemented as the computer class of a device that includes a personal computer, desktop computer, a multi-screen computer, laptop computer, netbook, and so on. The computing device 602 may also be implemented as the mobile class of device that includes mobile devices, such as a mobile phone, portable music player, portable gaming device, a tablet computer, a multi-screen computer, and so on.

The techniques described herein may be supported by these various configurations of the computing device 602 and are not limited to the specific examples of the techniques described herein. This is illustrated through inclusion of the data configuration module 114 and outcome prediction module 116 on the computing device 602. The functionality represented by the data configuration module 114 and outcome prediction module 116 and other modules/applications may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system of FIG. 6. For example, the functionality may be implemented in part on the computing device 602 as well as via the platform 616 that abstracts the functionality of the cloud 614.

Conclusion

Although the example implementations have been described in language specific to structural features and/or methodological acts, it is to be understood that the implementations defined in the appended claims are not necessarily limited to the specific features or acts described. Rather, the specific features and acts are disclosed as example forms of implementing the claimed features.

The invention claimed is:
1. In a digital medium prediction environment, a method implemented by a computing device, the method comprising:

receiving, by the computing device, a dataset representing elements and features of the elements, the features including:
a number indicating a count of how many links in a single item of email are opened; and
indications of whether conversion resulted from opening a respective said link;
generating, by the computing device, a plurality of decision trees having nodes corresponding to the features of the elements based on the dataset, the plurality of decision trees including an ensemble of classification and regression trees in a random forest model;
determining, by the computing device, weights for the plurality of decision trees by calculating errors, respectively, of outcomes of the plurality of decision trees based on the dataset to determine respective said weights for respective said decisions trees;
regularizing, by the computing device, the weights by applying a localized elastic net penalty to the weights, respectively;
applying, by the computing device, the regularized weights to respective decision trees of the plurality of decision trees;
generating, by the computing device, a prediction indicating a count of how many links included in a single subsequent item of email are to be opened, the generating including calculating a combined weighted average of outputs of the plurality of decision trees, the weighted average representing an outcome resulting from the features of the elements; and
outputting, by the computing device, the prediction.

2. The method of claim 1, wherein the dataset is a training dataset and the generating of the prediction is performed using a second dataset.

3. The method of claim 1, wherein the errors are calculated as a mean squared error, the mean squared error is a value found by subtracting an outcome predicted by a model from an actual outcome for each respective said element or said feature.

4. The method of claim 1, further comprising:
receiving, by the computing device, an input to test the single subsequent item of email; and
obtaining, by the computing device responsive to the input, a second dataset representing elements and features of the elements for the single subsequent item of email.

5. The method of claim 1, wherein the elements correspond to content recipients.

6. The method of claim 5, wherein the features of each respective element describe features of the content recipients.

7. The method of claim 1, wherein the dataset includes numeric and non-numeric data.

8. The method of claim 1, wherein the dataset is a training set of data that is part of a larger set of data, and the method further comprises:
using additional test data from the larger set of data to test an amount of error in the predicting of the outcome, wherein the additional test data is not part of the training set of data.

9. A system comprising:
a processing system; and
one or more computer-readable storage media having instructions stored thereon that, responsive to execution by the processing system, causes the processing system to perform operations including:
receiving a dataset representing elements and features of the elements, the features including:
a number indicating a count of how many links in a respective single item of email are opened; and
an indication of whether opening a respective said link resulted in conversion;
generating a plurality of decision trees having nodes corresponding to the features of the elements based on the dataset, the plurality of decision trees including an ensemble of classification and regression trees in a random forest model;
determining weights for the plurality of decision trees by calculating errors, respectively, of outputs of the plurality of decision trees based on the dataset to determine respective said weights for respective said decision trees;
regularizing the weights by applying a localized elastic net penalty, respectively;
applying the regularized weights to the plurality of decision trees;
generating a prediction indicating a count of how many links included in a single subsequent item of email are to be opened, the generating including calculating a combined weighted average of outputs of the plurality of decision trees, the weighted average representing an outcome resulting from the features of the elements.

10. The system of claim 9, wherein the dataset is a training dataset and the generating of the prediction is performed using a second dataset.

11. The system of claim 9, the operations further comprising:
receiving, by the computing device, an input to test the single subsequent item of email regarding how many links of a plurality of different links included in the single subsequent item of email are opened; and
obtaining, responsive to the input, a second dataset representing elements and features of the elements for the single subsequent item of email.

12. The system of claim 9, wherein the computing of the weights includes computing an error for the elements.

13. The system of claim 9, wherein the dataset includes numeric and non-numeric data.

14. The system of claim 9, the operations further comprising generating a data matrix from the dataset, wherein the data matrix includes rows and columns corresponding to the elements and the features of the elements.

15. A computer-readable storage media having instructions stored thereon that, responsive to execution by a processing system, causes the processing system to perform operations including:
receiving a dataset representing elements and features of the elements, the features including:
a number indicating a count of how many links in a respective single item of email are opened; and
an indication of whether opening a respective said link resulted in conversion;
generating a plurality of decision trees having nodes corresponding to the features of the elements based on the dataset, the plurality of decision trees including an ensemble of classification and regression trees in a random forest model;
determining weights for the plurality of decision trees by calculating errors, respectively, of outputs of the plurality of decision trees based on the dataset to determine respective said weights for respective said decision trees;

regularizing the weights by applying a localized elastic net penalty, respectively;

applying the regularized weights to the plurality of decision trees; and generating a prediction indicating a count of how many links included in a single subsequent item of email are to be opened, the generating including calculating a combined weighted average of outputs of the plurality of decision trees, the weighted average representing an outcome resulting from the features of the elements.

16. The computer-readable storage medium of claim 15, wherein the errors are calculated as a mean squared error, the mean squared error is a value found by subtracting an outcome predicted by a model from an actual outcome for each respective said element or said feature.

17. The computer-readable storage medium of claim 15, further comprising:

receiving, by the computing device, an input to test the single subsequent item of email; and obtaining, by the computing device responsive to the input, a second dataset representing elements and features of the elements for the single subsequent item of email.

18. The computer-readable storage medium of claim 15, wherein the elements correspond to content recipients.

19. The computer-readable storage medium of claim 15, wherein the dataset includes numeric and non-numeric data.

20. The computer-readable storage medium of claim 15, wherein the dataset is a training set of data that is part of a larger set of data, and further comprises:

using additional test data from the larger set of data to test an amount of error in the predicting of the outcome, wherein the additional test data is not part of the training set of data.

* * * * *